United States Patent
Shin et al.

(10) Patent No.: US 10,414,045 B2
(45) Date of Patent: Sep. 17, 2019

(54) DEVICE AND METHOD FOR CONTROLLING MOTOR

(71) Applicants: Hocheol Shin, Daejeon (KR);
Chang-Hoi Kim, Daejeon (KR);
Yong-Chil Seo, Daejeon (KR);
Jongwon Park, Daejeon (KR);
Byung-Seon Choi, Daejeon (KR);
Jeikwon Moon, Daejeon (KR)

(72) Inventors: Hocheol Shin, Daejeon (KR);
Chang-Hoi Kim, Daejeon (KR);
Yong-Chil Seo, Daejeon (KR);
Jongwon Park, Daejeon (KR);
Byung-Seon Choi, Daejeon (KR);
Jeikwon Moon, Daejeon (KR)

(73) Assignee: Korea Atomic Energy Research Institute, Daejeon (KR)

( * ) Notice: Subject to any disclaimer, the term of this patent is extended or adjusted under 35 U.S.C. 154(b) by 0 days.

(21) Appl. No.: 15/980,940

(22) Filed: May 16, 2018

(65) Prior Publication Data

US 2018/0264645 A1    Sep. 20, 2018

Related U.S. Application Data

(63) Continuation of application No. PCT/KR2016/011120, filed on Oct. 5, 2016.

(30) Foreign Application Priority Data

Dec. 18, 2015  (KR) .................. 10-2015-0182153

(51) Int. Cl.
*H02P 6/16* (2016.01)
*B25J 9/16* (2006.01)
(Continued)

(52) U.S. Cl.
CPC ............. *B25J 9/16* (2013.01); *B25J 9/102* (2013.01); *B25J 9/126* (2013.01); *H02P 6/16* (2013.01);
(Continued)

(58) Field of Classification Search
USPC .................. 318/264–286, 466–469, 626
See application file for complete search history.

(56) References Cited

U.S. PATENT DOCUMENTS 4,740,690 A * 4/1988 Mosier ............... G01D 5/34792
250/231.18
5,019,773 A * 5/1991 Sugiura ............. G01D 5/24409
324/166

(Continued)

FOREIGN PATENT DOCUMENTS

JP  2008 051668 A   3/2008
JP  2010249585 A   11/2010
(Continued)

*Primary Examiner* — Bentsu Ro
(74) *Attorney, Agent, or Firm* — Reinhart Boerner Van Deuren P.C.

(57) ABSTRACT

Disclosed are a device and a method for controlling a motor. According to a specific embodiment of the present disclosure, an input shaft of a motor is provided with a low-resolution absolute position detector and an output shaft of the motor is provided with a low-resolution absolute position detector having a resolution greater than or equal to a reduction gear ratio. An initial offset and an offset are defined accordingly, and a high-resolution output shaft absolute position is derived from a relational expression, which is defined by an input shaft absolute position received at a predetermined time interval, a derived offset, an output shaft absolute position, and the reduction gear ratio, such that it is possible to easily detect the high-resolution output shaft
(Continued)

absolute position by using a low-price absolute position detector without the modification or addition of an actuator.

5 Claims, 2 Drawing Sheets

(51) Int. Cl.
   *B25J 9/10* (2006.01)
   *B25J 9/12* (2006.01)
   *H02P 29/00* (2016.01)

(52) U.S. Cl.
   CPC ......... *H02P 29/0016* (2013.01); *Y10S 901/23* (2013.01); *Y10S 901/25* (2013.01)

(56) References Cited

U.S. PATENT DOCUMENTS

| | | | | |
|---|---|---|---|---|
| 5,844,814 A | * | 12/1998 | Chliwnyj | G01D 5/34715 700/30 |
| 2006/0001393 A1 | * | 1/2006 | Rozman | H02P 6/10 318/400.21 |
| 2006/0056833 A1 | * | 3/2006 | Kushida | H04N 5/23212 396/259 |

FOREIGN PATENT DOCUMENTS

| | | |
|---|---|---|
| JP | 5477292 B2 | 4/2014 |
| KR | 10 2006 0117542 A | 11/2006 |
| KR | 10 2014 0047437 A | 4/2014 |
| KR | 10 1461627 B1 | 11/2014 |

* cited by examiner

DEVICE AND METHOD FOR CONTROLLING MOTOR

CROSS-REFERENCE TO RELATED PATENT APPLICATIONS

This patent application is a continuation of PCT/KR2016/011120, filed Oct. 5, 2016, which claims priority to Korean Application No. 10-2015-0182153, filed Dec. 18, 2015, the entire teachings and disclosure of which are incorporated herein by reference thereto.

FIELD OF THE INVENTION

The present disclosure relates to a device and method for controlling a motor and, more particularly, to a technology that allows a device and method for controlling a motor to derive a high-resolution output shaft absolute position by using low-resolution output shaft absolute position.

BACKGROUND OF THE INVENTION

In a robot used in various fields from an industrial robot to a humanoid robot, an actuator having a deceleration function is used to increase a torque of a joint.

Particularly, convergence of technology is underway for a robot technology being rapidly developed recently, as mechanisms of robot engineering used only for a conventional industrial purpose are being incorporated into other industrial areas. Examples are development and production of robots for cleaning homes, programming education, toys, entertainment, and so on.

In many robots which use decelerators attached to a motor to increase torque of a rotating shaft, a rotation angle detector such as an encoder or a resolver to detect a rotation angle of a motor is used.

When an encoder providing an absolute position to such a robot joint is added or a means enabling obtaining an absolute position is used, the joint, that is, the output shaft absolute position of the decelerator, can be controlled.

Various methods are used for a measurement of output shaft absolute position, such as performing homing every time to start driving thereof by using a relative position detector to the input shaft of the motor, storing the absolute position by using a status detector to the input shaft, using multi-revolution absolute position detector to the input shaft, detecting the absolute position by comparing position values of the two detectors by providing relative position detectors on the input shaft and the output shaft, respectively, deriving the output shaft absolute position by providing an absolute position detector on the output shaft and so on.

However, when the relative position detector is used for the input shaft, performing homing process at a time to start driving is difficult, and when there is a concern that a safety problem may occur in the process of implementing homing, the homing process cannot be implemented right away.

In addition, when multi-revolution absolute position detector is used, expensive parts are required thus increasing cost, when a reduction gear ratio is greater than the practicable number of revolutions of the absolute position detector, the multi-revolution absolute position detector cannot be used, and when the absolute position is stored by using a battery, at the time the battery is replaced, setting of the initial absolute position value and calibration of the absolute position value should be implemented.

Meanwhile, when the absolute positions are derived by using relative position detectors on each of the input shaft and the output shaft, derivation of the absolute positions is possible only when the conditions are met, wherein that relative position detector of each of the input shaft and the output shaft should be able to produce phase Z output, the reduction gear ratio should be an integer while the reduction gear ratio and the resolution of the output shaft position detector should be relative prime, and the input shaft position detector has a resolution higher than the output shaft position detector.

In addition, when a high-resolution absolute position detector is used on the output shaft, there is a drawback that not only cost is increased from the expensive parts, but also the size thereof becomes large. On the other hand, when a low-resolution absolute position detector was used on the output shaft to complement such a problem, there was a drawback that an accuracy of an initial position of the motor decreased as much as the resolution of the output shaft position detector.

Therefore, in a method proposed in the present disclosure, by providing the low-resolution absolute position detectors on each of the input shaft and output shaft, a high-resolution output shaft absolute position value can be derived from a relational expression defined based on each detected absolute position, already defined offset, and a reduction gear ratio.

BRIEF SUMMARY OF THE INVENTION

Accordingly, the present disclosure has been made keeping in mind the above problems occurring in the related art and is intended to resolve such problems, and the objective of the present invention is to provide a device and method for controlling a motor as will be described. As an input shaft of a motor is provided with a low-resolution absolute position detector and an output shaft of the motor is provided with a low-resolution absolute position detector having a resolution greater than or equal to a reduction gear ratio, wherein an initial offset is set as an input shaft absolute position at the point of time when an output shaft absolute position becomes zero when an actuator is manufactured, an offset is defined as the input shaft absolute position at the point of time when the motor is driven and thus the output shaft absolute position is changed, and the defined offset is derived from a relational expression, which is defined by the initial offset, the input shaft absolute position, and the reduction gear ratio, without driving the motor, and a high-resolution output shaft absolute position is derived from a relational expression, which is defined by the input shaft absolute position received at a predetermined time interval, the derived offset, the output shaft absolute position, and the reduction gear ratio, such that it is possible to easily detect a high-resolution output shaft absolute position by using a low-price absolute position detector without modification or addition of an actuator.

Embodiments of the disclosure relate to a device for controlling a motor to accomplish the above objective includes,
  a low-resolution input shaft absolute position detector provided on an input shaft of a motor,
  a decelerator provided on an output shaft of the motor,
  a low-resolution output shaft absolute position detector having a resolution greater than or equal to a reduction gear ratio provided on an output shaft of the decelerator, and
  a motor control unit deriving a high-resolution output shaft absolute position based on an input shaft absolute position, an output shaft absolute position, and the reduction gear ratio of the decelerator.

The motor control unit may preferably include, an offset calculation module calculating a defined offset based on a relational expression which is established by defining an initial offset as the input shaft absolute position at the point of time when the output shaft absolute position becomes zero and the offset as the input shaft absolute position at the point of time when the motor is driven and thus the output shaft absolute position is changed, an input shaft calculation module deriving an input shaft calculation value based on a relational expression which is established based on the offset, the input shaft absolute position, and the reduction gear ratio, an output shaft calculation module deriving an output shaft calculation value based on the output shaft absolute position of the output shaft absolute position detector, and a high-resolution output shaft absolute position derivation module deriving the high-resolution output shaft absolute position by adding the derived input shaft calculation value and output shaft calculation value.

The input shaft absolute position detector is, an incremental-type position detector, the output shaft absolute position detector is a low-resolution output shaft absolute position detector, and the initial offset is set as zero.

Meanwhile, a method of controlling a motor based on the device described above includes, calculating a defined offset from a relational expression with respect to an initial offset, an input shaft absolute position, and a reduction gear ratio, by setting the initial offset as the input shaft absolute position at the point of time when an output shaft absolute position becomes zero, and an offset as the input shaft absolute position at the point of time when the motor is driven and thus the output shaft absolute position is changed, deriving an input shaft calculation value based on a relational expression which is already established based on the calculated offset, the input shaft absolute position, and the reduction gear ratio, deriving an output shaft calculation value by converting the output shaft absolute position of an output shaft absolute position detector into an angle, and deriving a high-resolution output shaft absolute position by adding the derived input shaft calculation value and output shaft calculation value.

As described above, according to the device and method for controlling the motor according to the present disclosure, as an input shaft of a motor is provided with a low-resolution absolute position detector and an output shaft of the motor is provided with a low-resolution absolute position detector having a resolution greater than or equal to a reduction gear ratio, an initial offset is set as an input shaft absolute position received at the point of time when an output shaft absolute position becomes zero, an offset is defined as the input shaft absolute position received at the point of time when the motor is driven and thus the output shaft absolute position is changed, and the defined offset is derived from a relational expression, which is defined by the initial offset, the input shaft absolute position, and the reduction gear ratio, without driving the motor, and a high-resolution output shaft absolute position is derived from a relational expression, which is defined by the input shaft absolute position received at a predetermined time interval, the derived offset, the output shaft absolute position, and the reduction gear ratio. Accordingly, it is possible to derive the output shaft absolute position by using the offset derived without driving the motor, to reduce manufacturing cost of the actuator for driving the motor, and to easily obtain the high-resolution output shaft absolute position without modification or addition of the actuator. Consequentially, there is an effect that reliability of the derived output shaft absolute position can be enhanced.

BRIEF DESCRIPTION OF THE SEVERAL VIEWS OF THE DRAWING

Following drawings accompanied to the present specification are illustrating exemplary embodiments of the present disclosure and play a role to help further understand technical concept of the present disclosure along with a detailed description of the present disclosure described below. Accordingly, it should not be understood that the present disclosure is limited to contents described in those drawings.

DETAILED DESCRIPTION OF THE INVENTION

Figure 1:
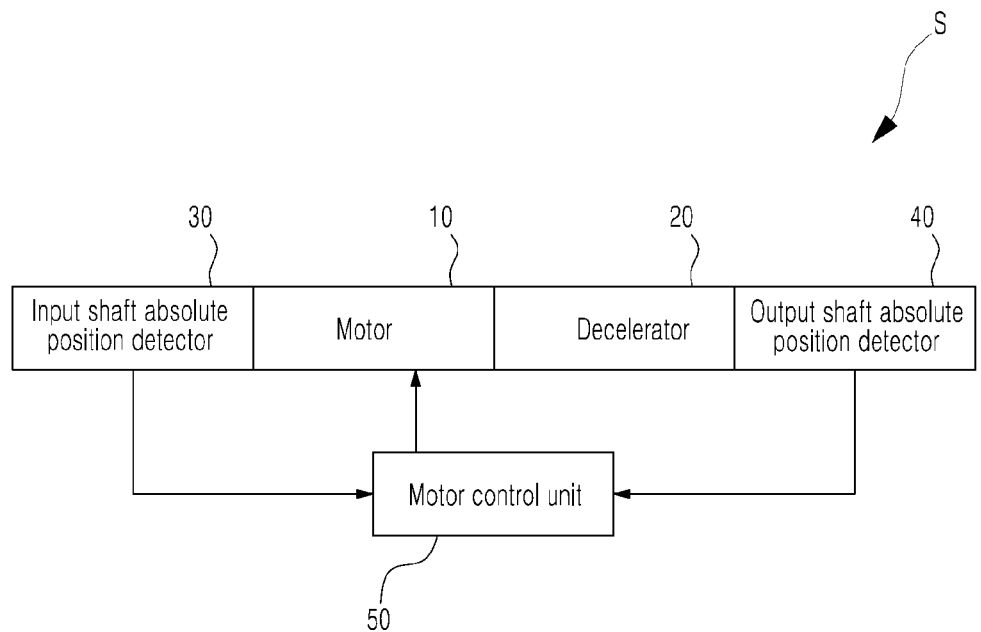
FIG. 1 is a block diagram illustrating a configuration of an actuator to which a device for controlling a motor according to an embodiment of the present disclosure is applied.

To fully understand the present disclosure, advantages of operation of the present disclosure, and objectives achieved by exemplary embodiments of the present disclosure, accompanying drawings and contents described in the drawings illustrating exemplary embodiments of the present disclosure should be referred to.

Hereinafter, the present disclosure will be described in detail by describing exemplary embodiments of the present disclosure with reference to the accompanying drawings. The same reference characters in the accompanying drawings denote the same elements.

As description on a specific structure or a function provided in embodiments of the present disclosure is to describe only the embodiments according to a concept of the present disclosure, the embodiments according to the concept of the present disclosure may be implemented in various modifications. In addition, it is to be understood that the present disclosure is not limited to the disclosed embodiments, but is intended to cover all modifications and equivalents or substitutes included within the spirit and technical scope of the present disclosure.

Meanwhile, though terms such as "the first" and/or "the second" used in the present disclosure may be used to explain various constituents, the constituents are not limited to such terms. The terms can be used for a purpose to distinguish one constituent from another constituent, for example, within a scope not deviating from a protection scope according to the concept of the present disclosure, and the first constituent may be named as the second constituent or the second constituent may be named as the first constituent.

When a constituent is referred to as being "connected" or "joined" to another constituent, this should be understood that the constituent may be directly connected or joined to the other constituent, but a different constituent may be interposed therebetween. In contrast, when a constituent is referred to as being "directly connected" or "directly joined" to another constituent, this should be understood that no different constituent is interposed therebetween. Other expressions to explain relationship between other constituents such as "between ~" and "just between ~" or "adjacent to ~" and "directly adjacent to ~" should be understood in the same way.

Terms used in the present specification are used to describe only specific embodiment and are not intended to limit the present disclosure. An expression in a singular form includes an expression in a plural form, unless the meaning is not obviously different contextually. It should be understood that terms such as "include" or "have" in the present disclosure are intended to designate the existence of a character, a numeral, a step, a movement, a constituent, a parts, or a combination of these which are embodied, and not to exclude at least one of other character, numeral, step, movement, constituent, parts, or combination of these, or an additional possibility.

Figure 2:
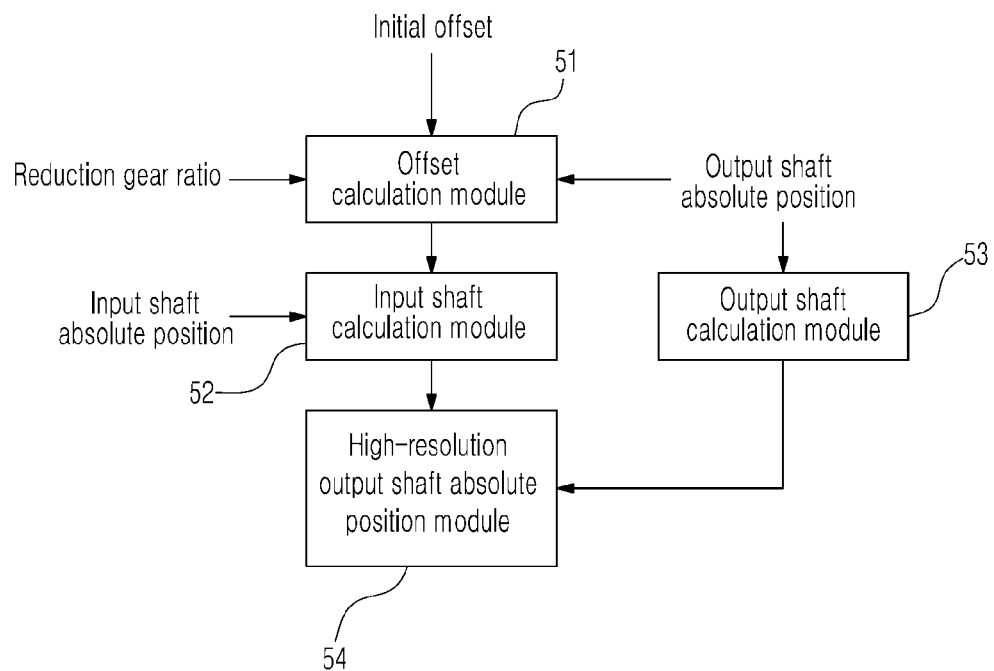
FIG. 2 is a block diagram illustrating a specific configuration of a motor control unit of a device for controlling a motor according to an embodiment of the present disclosure.

FIG. 1 is a block diagram illustrating a configuration of an actuator to which a device for controlling a motor according to an embodiment of the present disclosure is applied, and FIG. 2 is a block diagram illustrating a specific configuration of a motor control unit of the device for controlling the motor according to the embodiment of the present disclosure. Referring to FIGS. 1 to 2, the device for controlling the motor according to the embodiment of the present disclosure is implemented as in the following. As an input shaft of a motor is provided with a low-resolution absolute position detector and an output shaft of the motor is provided with a low-resolution absolute position detector having a resolution greater than or equal to a reduction gear ratio, an initial offset is set as an input shaft absolute position received at the point of time when an output shaft absolute position becomes zero, an offset is defined as the input shaft absolute position received at the point of time when the motor is driven and thus the output shaft absolute position is changed, and the defined offset is derived from a relational expression, which is defined by the initial offset, the input shaft absolute position, and the reduction gear ratio, without driving the motor, and, subsequently, the high-resolution output shaft absolute position is derived from a relational expression, which is defined by the input shaft absolute position received at a predetermined time interval, the offset, the output shaft absolute position, and the reduction gear ratio. Meanwhile, an actuator S to which such a device for controlling a motor is applied includes a motor 10, a decelerator 20, an input shaft absolute position detector 30, an output shaft absolute position detector 40, and a motor control unit 50.

The actuator S includes the motor 10 and the decelerator 20 having a reduction gear ratio of an integer and being connected to a driveshaft of the motor 10, and may further include the input shaft absolute position detector 30 connected to the input shaft of the motor 10 and the output shaft absolute position detector 40 connected to the output shaft of the decelerator 20, wherein each of the input shaft absolute position detector 30 and the output shaft absolute position detector 40 is implemented as having low-resolution being low in price.

Here, the input shaft absolute position detector may be implemented with an incremental-type position detector having phase A, phase B, and phase Z of the motor 10.

In addition, the actuator S includes the motor 10, the input shaft absolute position detector 30, the output shaft absolute position detector 40, and the control unit 50 electrically connected thereto.

The motor control unit 50 may be implemented as in the following. An initial offset is set as an input shaft absolute position at the point of time when an output shaft absolute position becomes zero. In addition, an offset is defined as the input shaft absolute position received at the point of time when the motor is driven and thus output shaft absolute position is changed. Subsequently, without driving the motor, the defined offset is derived from a relational expression, which is defined by the initial offset, the input shaft absolute position, and the reduction gear ratio. Finally, the high-resolution output shaft absolute position is derived from a relational expression, which is defined by the derived offset, each of the absolute position values supplied from the input shaft absolute position detector 30 and the output shaft absolute position detector 40, and the reduction gear ratio of the decelerator 20.

Accordingly, the motor control unit 50 as illustrated in FIG. 2, by defining a reference offset as the input shaft absolute position at the point of time when the motor 10 is driven and thus output shaft absolute position is changed, may include: an offset calculation module 51 deriving an offset defined by a relational expression which is defined by the initial offset, the input shaft absolute position, and the reduction gear ratio; an input shaft calculation module 52 deriving an input shaft calculation value ((pos_i−offset)*360/Ni)/R) which is defined as a subtracted value ((pos_i−offset)*360/Ni) divided by the reduction gear ratio R, wherein the subtracted value is derived by converting an input shaft absolute position value pos_i of the input shaft absolute position detector 30 minus the offset into an angle; an output shaft calculation module 53 deriving an output shaft calculation value ((pos_o)*360/No) by converting the output shaft absolute position value into an angle; and a high-resolution output shaft absolute position derivation module 54 deriving a high-resolution output shaft absolute position Ho by adding the input shaft calculation value of the input shaft calculation module 52 and the output shaft calculation value of the output shaft calculation module 53.

That is, the high-resolution output shaft absolute position Ho is represented as in the following equation 1.

$$Ho=pos\_o*360/No+((pos\_i-\text{offset})*360/Ni)/R \quad \text{[Equation 1]}$$

If pos_i−offset<0, Ho is represented as in the following equation 2.

$$Ho=pos\_o*360/No+((pos\_i-\text{offset}+Ni)*360/Ni)/R \quad \text{[Equation 2]}$$

Where, Ni, No are integer values converted from signals outputting from the input shaft absolute position detector 30 and the output shaft absolute position detector 40 per a rotation of an input shaft and an output shaft of the motor 10, and mean the resolutions in the present disclosure. That is, when resolution Ni or No converted into an integer at each of the input shaft absolute position detector 30 or the output shaft absolute position detector 40 is equal to or less than a predetermined criteria value, it is defined as low-resolution. Depending on such a resolution, precision control is possible for the motor 10.

Here, when the absolute position detector 30 is provided on the input shaft of the motor 10, the offset Off at the output shaft absolute position changing from the initial offset Off_0 at the point of time when an output shaft absolute position is zero satisfies the following equation 3.

$$\text{Off}=[(\text{Off}\_0)+Ni*(1-R)*pos\_o]\% Ni \quad \text{[Equation 3]}$$

where [(Off_0)+Ni*(1−R)*pos_o] represents a maximum integer not exceeding (Off_0)+Ni*(1−R)*pos_o. From equation 3, the output shaft absolute position value of the output shaft absolute position detector 40 changes when the resolution No and reduction gear ratio R are equal, and the offset Off at the output shaft absolute position is constant as the offset at the point of time when an output shaft absolute position is zero Off_0.

Meanwhile, when the incremental-type position detector is provided on the input shaft and the low-resolution absolute position detector is installed on the output shaft, the initial offset at the point of time when the output shaft absolute position is zero Off_0 is set as zero; the offset Off is determined by using the output shaft absolute position pos_o obtained by driving the motor 10 until a position value of the output shaft absolute position detector is changed and the equation 3 above; and, with the same value, a position value of the input shaft incremental-type position detector is determined. Subsequently, the high-resolution output shaft absolute position Ho is derived by using the equation 1 on the basis of the determined offset Off.

Accordingly, as the low-resolution absolute position detectors are provided with each of the input shaft and the output shaft of the motor, the initial offset is set as the input shaft absolute position at the point of time when an output shaft absolute position becomes zero, the offset is set as the input shaft absolute position received at the point of time when the motor is driven and thus output shaft absolute position is changed, and the high-resolution output shaft absolute position is derived from a relational expression, which is defined by the input shaft absolute position received at a predetermined time interval, the offset, the output shaft absolute position, and the reduction gear ratio. Accordingly, a manufacturing cost of the actuator for driving the motor can be reduced and the high-resolution output shaft absolute position can be easily obtained without the modification or addition of the actuator, whereby a reliability of the derived high-resolution output shaft absolute position can be enhanced.

With each of the input shaft and the output shaft of the motor provided with the low-resolution absolute position detector, a series of process to derive the high-resolution output shaft absolute position based on relational expression is described with reference to FIG. 3, wherein the relational expression is set based on each of absolute position values, the reduction gear ratio, and the predetermined offset value.

Figure 3:
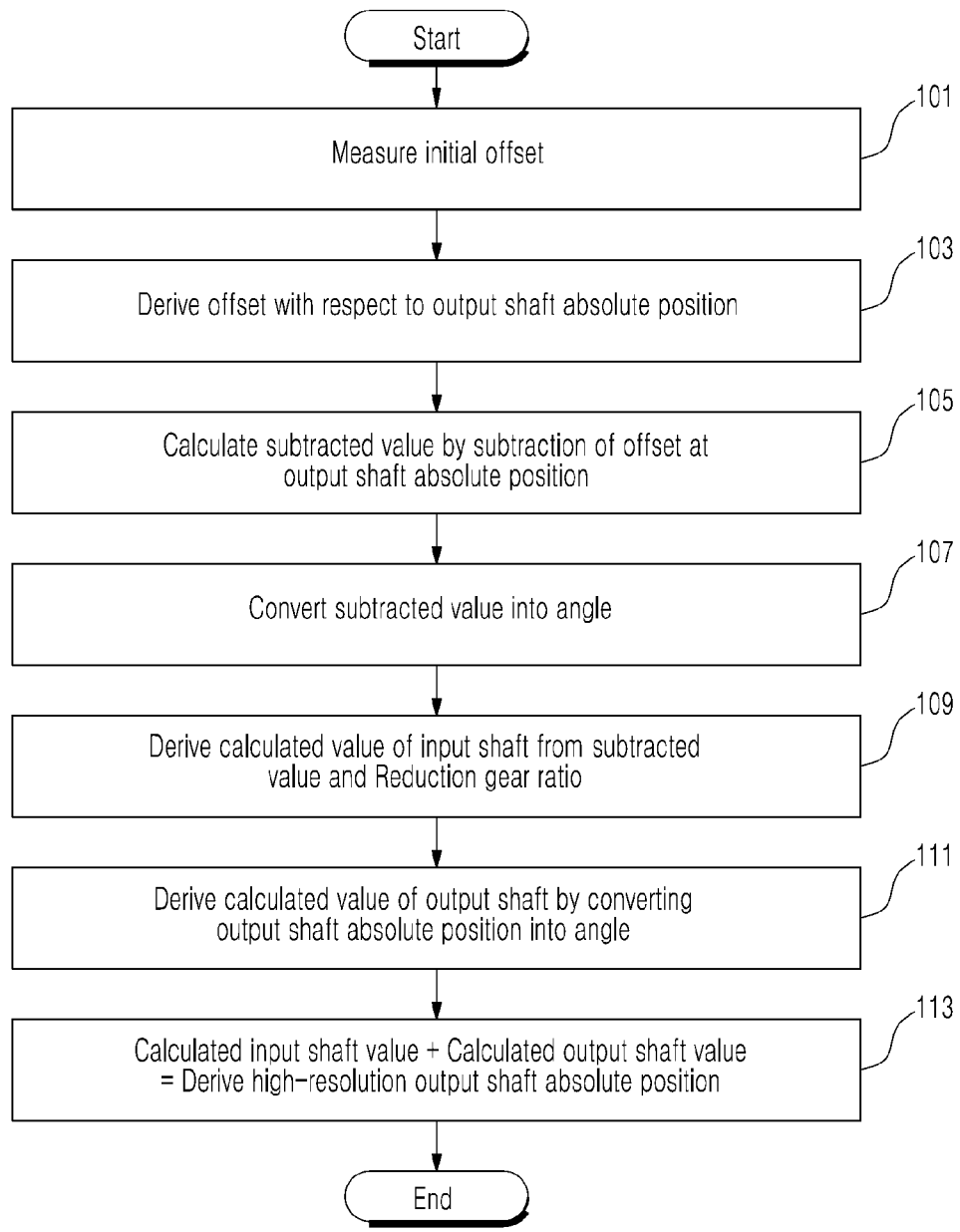
FIG. 3 is a flow chart illustrating a process of controlling a motor according to an embodiment of the present disclosure.

FIG. 3 is a flow chart illustrating an operation process of the motor control unit 50 illustrated in FIG. 1, and the process of the motor control according to an embodiment of the present disclosure will be described with reference to FIG. 3.

First, the motor control unit 50: sets the initial offset as the input shaft absolute position at the point of time when an output shaft absolute position becomes zero; defines the offset as the input shaft absolute position at the point of time when the motor is driven and thus output shaft absolute position is changed; derives the defined offset from the relational expression which is defined by the initial offset, the input shaft absolute position, and the reduction gear ratio; and, subsequently, after calculating a subtracted value by subtracting the offset from the input shaft absolute position, converts the subtracted value into an angle (Steps 101, 103, 105, and 107).

In addition, the motor control unit 50 derives an input shaft calculation value by dividing the subtracted value converted into the angle by the reduction gear ratio of the decelerator (Step 109).

Meanwhile, the motor control unit 50 derives an output shaft calculation value by converting the output shaft absolute position of the output shaft absolute position detector into the angle (Step 111).

Subsequently, calculation values of the input shaft and the output shaft are added by the motor control unit 50, and the added absolute position is derived as the high-resolution output shaft absolute position (Step 113).

Accordingly, according to an embodiment of the present disclosure, as the input shaft of a motor is provided with the low-resolution absolute position detector and output shaft of the motor is provided with the low-resolution absolute position detector having a resolution greater than or equal to the reduction gear ratio, the initial offset is set as the input shaft absolute position at the point of time when the output shaft absolute position becomes zero when an actuator is manufactured, the offset is defined as the input shaft absolute position at the point of time when the motor is driven and thus output shaft absolute position is changed, and the defined offset is derived from the relational expression, which is defined by the initial offset, the input shaft absolute position, and the reduction gear ratio, without driving the motor, and the high-resolution output shaft absolute position is derived from a relational expression, which is defined by the input shaft absolute position received at a predetermined time interval, the derived offset, the output shaft absolute position, and the reduction gear ratio, such that it is possible to easily detect an high-resolution output shaft absolute position by using the low-price absolute position detector without the modification or addition of an actuator.

While this disclosure has been described in detail with reference to exemplary embodiments, it is to be understood that the invention is not limited to the disclosed embodiments. Accordingly, it should be understood that the technical concept of the present disclosure extends to the scope that those skilled in the art can change or modify without departing from the gist of the present disclosure claimed in claims below.

As the input shaft of the motor is provided with the low-resolution absolute position detector and the output shaft of the motor is provided with the low-resolution absolute position detector having the resolution greater than or equal to the reduction gear ratio, the initial offset is set as the input shaft absolute position at the point of time when the output shaft absolute position becomes zero when the actuator is manufactured, the offset is defined as the input shaft absolute position at the point of time when the motor is driven and thus output shaft absolute position is changed, and the defined offset is derived from the relational expression, which is defined by the initial offset, the input shaft absolute position, and the reduction gear ratio, without driving the motor, and the high-resolution output shaft absolute position is derived from the relational expression, which is defined by the input shaft absolute position received at the predetermined time interval, the derived offset, the output shaft absolute position, and the reduction gear ratio. Accordingly, significant advancement in an accuracy, reliability and performance efficiency of the device and method for controlling the motor may be realized. As the actuator and motor not only have a potential to come to the market but also are practical in that they are clearly implementable, the present disclosure has a potential for the industrial applicability.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A device for controlling a motor, the device comprising:
   a low-resolution input shaft absolute position detector provided on an input shaft of a motor;
   a decelerator provided on an output shaft of the motor;
   a low-resolution output shaft absolute position detector having a resolution greater than or equal to a reduction gear ratio provided on an output shaft of the decelerator; and
   a motor control unit deriving a high-resolution output shaft absolute position based on an input shaft absolute position, an output shaft absolute position, and the reduction gear ratio of the decelerator.

2. The device of claim 1, wherein the motor control unit is configured to:
   set an initial offset as the input shaft absolute position at the point of time when the output shaft absolute position becomes zero;
   derive an input shaft calculation value based on a derived offset, the input shaft absolute position, and the reduction gear ratio, wherein, by defining the offset as the input shaft absolute position at the point of time when the motor is driven and thus the output shaft absolute position is changed, the defined offset is derived based on the initial offset, a resolution of the input shaft absolute position detector, the reduction gear ratio, and the output shaft absolute position;
   derive an output shaft calculation value based on the output shaft absolute position; and
   derive the high-resolution output shaft absolute position based on the derived input shaft calculation value and output shaft calculation value.

3. The device of claim 2, wherein the input shaft absolute position detector is an incremental-type position detector, the output shaft absolute position detector is a low-resolution output shaft absolute position detector, and the initial offset is set as zero.

4. The device of claim 1, wherein the motor control unit includes:
   an offset calculation module calculating an offset based on a relational expression which is already established by defining an initial offset as the input shaft absolute position at the point of time when the output shaft absolute position becomes zero and the offset as the input shaft absolute position at the point of time when the motor is driven and thus the output shaft absolute position is changed;
   an input shaft calculation module deriving an input shaft calculation value based on a relational expression which is already established based on the calculated offset, the input shaft absolute position, and the reduction gear ratio;
   an output shaft calculation module deriving an output shaft calculation value based on the output shaft absolute position of the output shaft absolute position detector; and
   a high-resolution output shaft absolute position derivation module deriving the high-resolution output shaft absolute position by adding the derived input shaft calculation value and output shaft calculation value.

5. A method of controlling a motor, the method comprising:
   setting an initial offset as an input shaft absolute position at the point of time when an output shaft absolute position becomes zero;
   calculating a defined offset based on a relational expression which is already established by defining the offset as the input shaft absolute position at the point of time when the motor is driven and thus the output shaft absolute position is changed;
   deriving an input shaft calculation value based on a relational expression which is already established based on a relational expression which is already established based on the calculated offset, the input shaft absolute position, and the reduction gear ratio;
   deriving an output shaft calculation value by converting the output shaft absolute position of an output shaft absolute position detector into an angle; and
   deriving a high-resolution output shaft absolute position by adding the derived input shaft calculation value and output shaft calculation value.

* * * * *